Feb. 23, 1954    G. A. LYON    2,670,244
WHEEL COVER
Original Filed Nov. 24, 1944
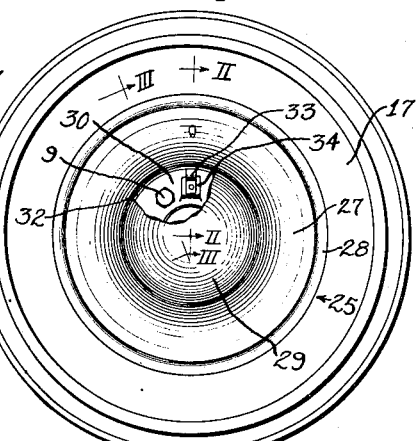
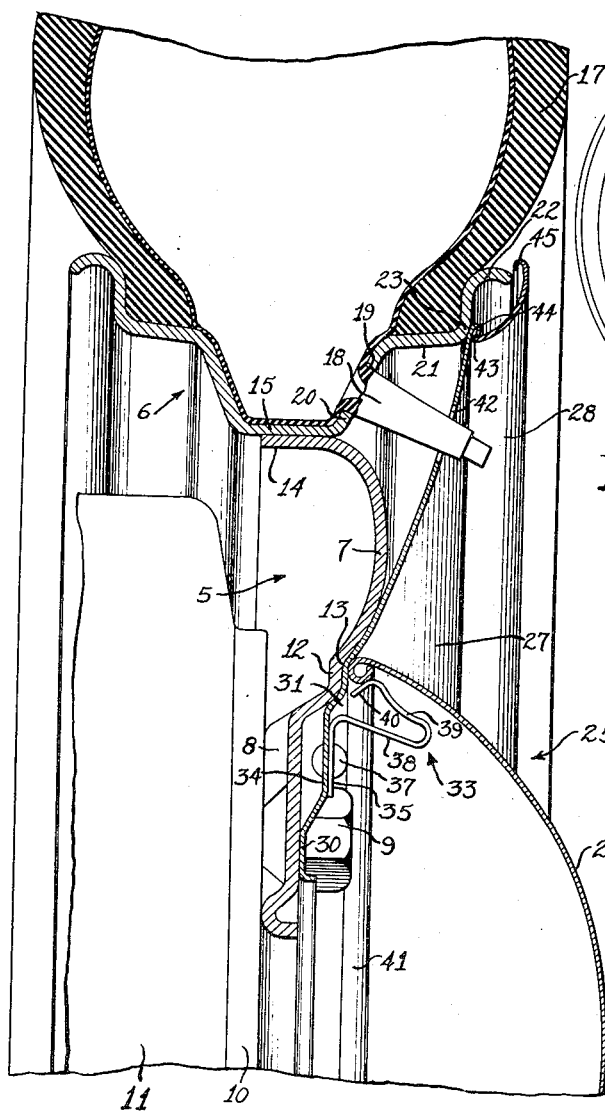
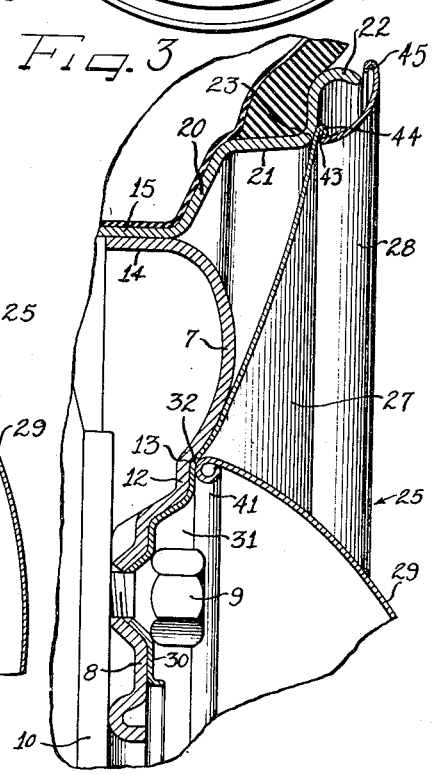
Inventor
George Albert Lyon
by The Firm of Charles W. Hill Attys Patented Feb. 23, 1954

2,670,244

UNITED STATES PATENT OFFICE 2,670,244

WHEEL COVER

George Albert Lyon, Detroit, Mich.

Original application November 24, 1944, Serial No. 564,971, now Patent No. 2,541,079, dated February 13, 1951. Divided and this application March 14, 1950, Serial No. 149,633

7 Claims. (Cl. 301—37)

This invention relates to wheel structures and more particularly to the ornamental covering of the outer sides of vehicle wheels.

An important object of the present invention is to provide an improved wheel structure having a cover which is not subject to rattling, squeaks or other undesirable noises, and in which substantial manufacturing tolerances are permitted while yet affording a close fit between the cover and the wheel.

Another object of the invention is to provide an improved wheel cover that is adapted to be secured to the central or nave part of a wheel and to be held thereon by the usual bolts by which the wheel is secured to an axle part of the vehicle with which the wheel is used.

A further object of the invention is to provide an improved and simplified structure including a multipart arrangement and which is rugged, economical to manufacture and reliable in use.

A still further object of the invention is to provide a cover structure for a vehicle wheel that is adapted to form a tight fit with a rim portion of the wheel despite manufacturing tolerances allowed in mass production of wheel parts.

Yet another object of the invention is to provide an improved composite wheel cover structure having improved relationship of the component parts of the wheel to maintain the same in accurately centered relation in service.

It is also an object of the present invention to provide a novel cooperative relationship between a vehicle wheel and a cover for maintaining the cover in properly centered relation on the wheel.

Other objects, features and advantages of the present invention will be apparent from the following detailed description of a preferred embodiment taken in conjunction with the accompanying drawings in which, Figure 1 is a side elevational view of a vehicle wheel and cover embodying the features of the present invention with a portion of the cover broken away to reveal details therebehind;

Figure 2 is an enlarged radial sectional detail view taken substantially on the line II—II of Figure 1; and Figure 3 is an enlarged radial sectional view taken substantially on the line III—III of Figure 1.

A vehicle wheel with which the present invention is concerned comprises a wheel body 5 and a tire rim 6 both of which may be made from appropriate gauge sheet metal, the body being formed as a stamping and the tire rim as a rolled section.

The wheel body 5 comprises a generally axially outwardly bulged intermediate annular portion 7 formed at its radially inner section with a bolt-on flange 8 appropriately apertured to accommodate attachment bolts 9 by which the wheel is attached to a vehicle axle part 10 carrying a brake drum 11. Intermediate the portions 7 and 8 of the wheel body is provided a stepped formation 12 defining a generally axially outwardly opening annular groove 13.

At its outer periphery, the wheel body 5 is formed with a generally axially inwardly extending flange 14 which is appropriately secured to a base flange 15 of the tire rim. Extending from the base flange 15 the tire rim is provided with appropriate multi-flanged structure to afford a drop center structure to accommodate a pneumatic tire and tube assembly 17, the tube of which has a valve stem 18 projecting through a valve stem opening 19 in an outer side flange 20 of the tire rim. From the side flange 20 extends an intermediate flange 21 which merges with a terminal flange 22, the juncture of the intermediate and terminal flanges providing a generally axially outwardly extending shoulder 23 which is generally rounded in formation.

In the manufacture of vehicle wheels on a large scale production basis, it is prohibitively expensive to provide the outer surface of the body part 5 and usually also the tire rim 6 with a finish that is satisfactory for an external or visible part of the vehicle wheel. Accordingly, there is provided by the present invention a cover assembly 25 for disposition at the outer side of the wheel in concealing relation to both the body portion 5 and the outer side of the tire rim 6.

The wheel cover assembly 25 comprises an annular cover member 27 having an annular bead-like trim ring member 28 attached to its radially outer margin, and carrying a central detachable circular cover member or hub cap 29. All of the cover components are preferably made from appropriate gauge sheet metal or other suitable sheet material or combinations of sheet material which may be finished in any desired manner in the same color or in contrasting colors or with a bright polished or plated finish.

The cover part 27 comprises the main body portion of the cover assembly and is of a size to substantially cover the wheel body 5 and a substantial portion of the tire rim 6. For this purpose, the cover member 27 has an expanse to extend from the bolt-on flange 8 of the wheel to tire rim shoulder 23. At its inner margin, the cover member 27 is formed with an inset bolt-on flange 30 which is formed substantially complementary to the bolt-on flange 8 of the wheel body so as to engage the wheel body bolt-on flange in fairly snug relation, being apertured and flanged in such manner that the attachment bolts 9 will engage and clamp the cover bolt-on flange 30 to the wheel body bolt-on flange 8 as best seen in Fig. 3. Immediately radially outwardly adjacent the bolt-on flange 30 a stepped formation 31 of the cover member 27 is complementary to the stepped formation 12 of the wheel body and includes a generally axially inwardly projecting annular rib 32 which fits in the groove 13 and provides an axially outwardly opening groove receptive of the edge of the hub cap 29 in assembly.

For retaining the hub cap 29 in the assembly, a series of retaining springs 33 are mounted on the bolt-on flange 30 of the cover. For this purpose, the bolt-on flange 30 is formed with a radially extending, axially outwardly projecting rib 34 for supporting each of the clips 33. The clip-supporting ribs 34 extend radially inwardly from the stepped formation 31 of the cover member 27. Each of the clips 33 has a base flange 35 secured as by means of a rivet 37 to the associated supporting rib 34. From the radially outer end of the base 35 extends generally axially outwardly a gooseneck cover-retaining head including an intermediate flange 38, a generally radially outwardly and axially inwardly extending inwardly bowed cam flange 39 and an axially inwardly and radially inwardly directed retaining terminal or shoulder flange 40. The shoulder flange 40 is disposed opposite the grooved rib 32.

In applying the hub cap 29, an underturned curled edge bead 41 of the hub cap is applied against the cam flange 39 of the clips and the hub cap 29 is pressed axially inwardly to cause the heads of the clips to flex and permit the bead 41 to snap behind the retaining terminal shoulder flanges 40 of the clips into the rib groove 32. The arrangement of the clips is such that while the hub cap can be applied easily, it is substantially more difficult to remove the same, namely the clips permit an easy-on, hard-off hub cap retaining operation.

By virtue of engagement of the hub cap bead 41 in the groove 32 and the strong resilient locking of the bead in such groove by the clips 33 the hub cap 29 is held firmly centered with respect to the cover member 27. Furthermore, it will be observed that since the cover member 27 radially outwardly from the rib groove 32 rests against the wheel body portion 7 a solid backing is afforded for a pry-off tool applied under the bead 41 of the hub cap to pry the same free from the clips, such backing assuring that the cover member 27 will not be dented in the application of pry-off force in dislodging the hub cap.

From the rib-groove 32, the annular cover member 27 extends generally radially outwardly to the outer marginal engagement with the tire rim shoulder 23. By preference the portion of the cover 27 which extends between the wheel body portion 7 and the shoulder 23 is of large radius convex formation so as to afford a substantial degree of resilience thereto. Initially the outer margin of the cover member 27 preferably extends axially inwardly beyond the plane occupied by the margin in the assembled condition with the wheel. That is, the radially outer margin of the cover member 27 is in assembly with the wheel deflected axially outwardly relative to the bolt-on flange portion 30 of the cover member by placing the cover member 27 under substantial tension by drawing the bolt-on flange portion 30 against the bolt-on flange 8 of the wheel body and thereby driving the outer margin of the cover member 27 against the tire rim shoulder 23. This is quite advantageous since it prevents rattling of the cover member 27 against the tire rim and furthermore because it excludes dirt and foreign matter from entering behind the cover from the outside of the cover.

By having the outer margin of the cover member 27 engage against the shoulder 23, the advantage is gained that the shoulder 23 is in large scale manufacture made with closer tolerance than the extremity or edge of the tire rim terminal flange 22 and therefore a better and closer fit about the entire continuous circle of contact is attained between the periphery of the cover part 27 and the tire rim shoulder 23. In addition, the periphery of the cover part 27 is thus protected by the axially outwardly projecting terminal flange portion of the tire rim 22 against curbing or like damage. The tensioned engagement of the cover member 27 with the tire rim automatically compensates for slight manufacturing variations in the axial assembly of the wheel body and tire rim parts. The tension of the cover member 27 also has a beneficial effect upon the attachment bolts 9 since the pressure thus generated on the bolts prevents the bolts from becoming loose during service of the vehicle. Also, by having the outer periphery of the cover part 27 nesting against the shoulder 23 of the tire rim, the cover member 27 is brought in closer to the side flange 20 of the tire rim and thus permits the valve stem 18 to project through a valve stem aperture 42 in the cover member 27 and enables ample access to the valve stem without requiring any disturbance of the cover.

The mounting and disposition of the annular trim member 28 is such that in service it is capable of withstanding curbing pressure, deflated tire side wall thrust, or the like resiliently and with minimum liability of damage. To this end the member 28 is preferably of convex cross section with its inner margin turned under and generally radially outwardly therebehind to provide a reinforcing flange 43 which is in lock seamed engagement with a marginal outturned and generally radially inwardly extending flange 44 on the outer margin of the cover member 27. From the lock seamed joint 43—44, the cover member 28 curves generally axially outwardly and radially outwardly in spaced relation to the edge of the terminal flange 22 and projects somewhat radially outwardly therebeyond and has a turned under reinforcing outer marginal flange 45. Through this arrangement it will be apparent that on receiving a radially inward thrust, the cover member 28 may yield due to its inherent resiliency and by virtue of its flanged interconnection with the cover member 27 and the cover annulus 28 can also yield axially inwardly to a substantial extent by reason of its spaced relation to the tire rim terminal flange.

The present application is a division of my application Serial No. 564,971, filed November 24, 1944, now Patent No. 2,541,079.

It will be understood that modifications and variations may be effected without departing from the scope of the novel concepts of the present invention.

I claim as my invention:

1. In a wheel cover structure, a cover to be secured to a wheel body part, the center of said cover having a plurality of radially extending ribs disposed circularly about the cover axis, and respective hub cap retaining spring elements secured to said ribs.

2. In a cover structure for a vehicle wheel including flanged body and rim parts supporting a tire, a cover having a radially outwardly stepped center portion to be clamped in nested relationship to a correspondingly stepped central portion of a wheel body part, a plurality of radially extending, spaced ribs projecting axially outwardly from one of the steps of said cover and having attached thereto respective hub cap retaining elements.

3. In a cover structure for a vehicle wheel including flanged body and rim parts supporting a tire, a cover having a radially outwardly stepped center portion to be clamped in nested relationship to a correspondingly stepped central portion of a wheel body part, a plurality of radially extending, spaced ribs projecting axially outwardly from one of the steps of said cover and having attached thereto respective hub cap retaining elements, the cover member having an annular groove therein radially outwardly of said ribs, and a hub cap having its edge seated in said groove and retained therein by said clips.

4. In a cover structure for disposition at the outer side of a vehicle wheel, a cover member having a central bolt-on flange, a stepped formation radially outwardly from said bolt-on flange and defining a generally axially outwardly opening groove, and a hub cap member having a turned margin assembled with said cover member in said groove, said bolt-on flange having a plurality of gooseneck retaining clips disposed to engage and retain said hub cap turned edge in said groove.

5. In a wheel structure including a wheel body and a tire rim, the wheel body having a central bolt-on flange and a step formation radially outwardly of said bolt-on flange, a cover including a member having a bolt-on flange nested with the bolt-on flange of the wheel body and secured thereto and having a step formation complementary to and nested with the step formation of the wheel body, the outer margin of said cover member bearing against the tire rim spaced from the tip of the tire rim, an annular ornamental bead of curved cross section secured to the outer margin of the cover member and extending radially and axially outwardly into spaced overlying relation to the tire rim tip, and a hub cap overlying the center of the cover member and having its edge seated in the step formation of the cover member.

6. In a wheel structure including a wheel body and a tire rim, the wheel body having an annular bulged body portion and a central bolt-on flange, with a step formation between the bolt-on flange and said bulged portion, a cover assembly formation complementary to and nested with the step formation of the wheel body and with the portion of the cover member radially outwardly of said respective stepped formations lying against said bulged portion of the wheel body, and a hub cap having its margin seated on said step formation of the cover member in such relation that a pry-off tool can be inserted under the margin of the hub cap and leverage applied to the cover member where it is backed by bearing against said bulged portion of the wheel body.

7. In a wheel structure including a tire rim and a wheel body, said wheel body having a central bolt-on flange and a body portion disposed radially outwardly from said bolt-on flange and having an annular generally axially outwardly opening groove therein, a cover for disposition at the outer side of the wheel having a portion to lie opposite the tire rim and a portion engaging the wheel body, said wheel body engaging portion having a groove formation complementary to the groove in the wheel body and nesting therein and a part lying opposite the bolt-on flange for attachment to the wheel, retaining clips mounted radially inwardly from the groove formation in the cover and having resilient cover retaining heads located adjacent to said groove formation, and a hub cap having a beaded edge nested in said groove formation of the cover and retained therein by engagement thereof by the resilient heads of said clips.

GEORGE ALBERT LYON.

References Cited in the file of this patent
UNITED STATES PATENTS

| Number | Name | Date |
| --- | --- | --- |
| 2,136,137 | Kellogg | Nov. 18, 1938 |
| 2,183,220 | Horn | Dec. 12, 1939 |
| 2,190,669 | Lyon | Feb. 20, 1940 |

FOREIGN PATENTS

| Number | Country | Date |
| --- | --- | --- |
| 254,946 | Italy | Sept. 29, 1927 |